(12) United States Patent
Schnur et al.

(10) Patent No.: US 11,654,877 B2
(45) Date of Patent: May 23, 2023

(54) SYSTEM AND METHOD FOR DETECTING BRAKE FADING IN A VEHICLE

(71) Applicant: Robert Bosch GmbH, Stuttgart (DE)

(72) Inventors: Jonathan P. Schnur, Treis-Karden (DE); Fu-Long Chang, Ann Arbor, MI (US); Niklas Guentert, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 326 days.

(21) Appl. No.: 16/957,783

(22) PCT Filed: Dec. 26, 2018

(86) PCT No.: PCT/US2018/067522
§ 371 (c)(1),
(2) Date: Jun. 25, 2020

(87) PCT Pub. No.: WO2019/133622
PCT Pub. Date: Jul. 4, 2019

(65) Prior Publication Data
US 2021/0284113 A1    Sep. 16, 2021

Related U.S. Application Data

(60) Provisional application No. 62/610,631, filed on Dec. 27, 2017.

(51) Int. Cl.
*B60T 8/00* (2006.01)
*B60T 8/88* (2006.01)
(Continued)

(52) U.S. Cl.
CPC .............. *B60T 8/885* (2013.01); *B60T 8/171* (2013.01); *B60T 8/92* (2013.01);
(Continued)

(58) Field of Classification Search
CPC . B60T 8/885; B60T 8/171; B60T 8/92; B60T 2270/404; B60T 2270/406;
(Continued)

(56) References Cited

U.S. PATENT DOCUMENTS 3,975,706 A * 8/1976 Kato ................ F16D 66/00
200/61.4
5,613,744 A   3/1997 Eslinger et al.
(Continued)

FOREIGN PATENT DOCUMENTS

CN     106240542 A    12/2016
DE     10320175 B4     6/2012
(Continued)

OTHER PUBLICATIONS

International Search Report and Written Opinion for Application No. PCT/US2018/067522 dated Mar. 26, 2019 (15 pages).

(Continued)

*Primary Examiner* — Shardul D Patel
(74) *Attorney, Agent, or Firm* — Michael Best & Friedrich LLP (57) ABSTRACT

A system (100) and a method (300) for detecting brake fading in a vehicle. The system (100) includes at least one sensor (140-143) configured to gather data about at least one brake (110-113) in a vehicle (105), a braking system (130), a braking system sensor (145) configured to gather data about the braking system (130), and an electronic controller (150) configured to receive data from at least one selected from the group consisting of the at least one sensor (140-143) and the braking system sensor (145), and determine, based on the data, a level of brake fading of the vehicle (105). The method (300) comprises receiving (305), with an electronic controller (150), data from at least one of the group consisting of at least one sensor (140-143) and a (Continued)

braking system sensor (145); and determining (310), with the electronic controller (150), a level of brake fading of a vehicle (105) based upon the data.

14 Claims, 7 Drawing Sheets

(51) Int. Cl.
*B60T 8/171* (2006.01)
*B60T 8/92* (2006.01)

(52) U.S. Cl.
CPC ... *B60T 2270/404* (2013.01); *B60T 2270/406* (2013.01); *B60T 2270/82* (2013.01); *B60T 2270/88* (2013.01)

(58) Field of Classification Search
CPC .. B60T 2270/82; B60T 2270/88; B60T 17/22; B60T 8/326; B60T 17/221; B60T 8/17; B60T 8/00; F16D 2066/001; F16D 2066/005
USPC .......................................................... 701/70
See application file for complete search history.

(56) References Cited

U.S. PATENT DOCUMENTS

| | | | |
|---|---|---|---|
| 6,460,941 | B1 | 10/2002 | Zenzen et al. |
| 6,859,712 | B2 | 2/2005 | Walenty et al. |
| 8,731,795 | B2 | 5/2014 | Frashure et al. |
| 9,008,901 | B2 | 4/2015 | Udaka |
| 9,499,147 | B2 | 11/2016 | Yamasoe et al. |
| 2010/0114444 | A1* | 5/2010 | Verhagen ............... B60T 13/686 701/70 |
| 2011/0272230 | A1* | 11/2011 | Sekiya .................... B60T 17/22 188/106 P |
| 2016/0016568 | A1* | 1/2016 | Ishida ................... B60T 13/162 303/15 |
| 2017/0297573 | A1 | 10/2017 | Fraser et al. |

FOREIGN PATENT DOCUMENTS

| | | |
|---|---|---|
| DE | 102014102536 A1 | 8/2015 |
| GB | 1294823 A | 11/1972 |
| GB | 2523755 A | 9/2015 |
| JP | H01224648 A | 9/1989 |
| JP | H0222389 A | 1/1990 |
| JP | H04121265 A | 4/1992 |
| JP | H1191550 A | 4/1999 |
| JP | H1191550 A * | 4/1999 |
| JP | 2001206218 A | 7/2001 |
| KR | 1997046106 A | 7/1997 |
| KR | 19990076460 A | 10/1999 |
| KR | 20100040358 A | 4/2010 |
| KR | 20110029269 A | 3/2011 |
| KR | 20160087499 A | 7/2016 |

OTHER PUBLICATIONS

Translation of National Intellectual Property Administration, P.R. China, First Office Action for Application No. 201880083808.7 dated Dec. 3, 2021 (10 pages).

* cited by examiner

FIG. 7

SYSTEM AND METHOD FOR DETECTING BRAKE FADING IN A VEHICLE

CROSS REFERENCE TO RELATED APPLICATIONS

This application claims priority to U.S. Provisional Patent Application No. 62/610,631, filed Dec. 27, 2017, the entire contents of which is incorporated by reference in its entirety.

FIELD

Embodiments relate to detecting brake fading in a vehicle.

SUMMARY

Brakes on a vehicle may reach temperatures (through repetitive braking, constant braking, downhill braking, or other use cases) where the brakes may lose power due to the temperature. This effect is known as "brake fading".

Brake fading can be detected in standard servo and vacuum braking systems by an operator of a vehicle due to a direct connection between a brake pedal and a base brake system, which allows the operator to "feel" when the brake fades during operation through the brake pedal. However, some braking systems are "by-wire" systems, which have no physical connection between the brake pedal and the braking system. Rather, pressing the brake pedal sends an electrical signal to the braking system. Because of this, brake fading cannot be detected by the operator. Therefore, a method of determining a level of brake fading in a vehicle is needed.

Embodiments described herein include, among other things, systems and methods for detecting brake fading in a vehicle.

In one embodiment, a system for detecting brake fading is provided. The system for detecting brake fading includes at least one sensor configured to gather data about at least one brake in a vehicle, a braking system, a system sensor configured to gather data about the braking system, and an electronic controller configured to receive data from at least one of the group consisting of the at least one sensor associated with the brake and the braking system sensor, determine, based on the data, a level of brake fading of the vehicle, and provide a warning to a user of the vehicle based upon the determined level of brake fading.

In another embodiment, a method for detecting brake fading is provided. The method for detecting brake fading includes receiving, with an electronic controller, data from at least one of the group consisting of at least one sensor and a braking system sensor, determining, with the electronic controller, a level of brake fading of a vehicle based upon the data, and providing, with the electronic controller, a warning to a user based upon the determined level of brake fading.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
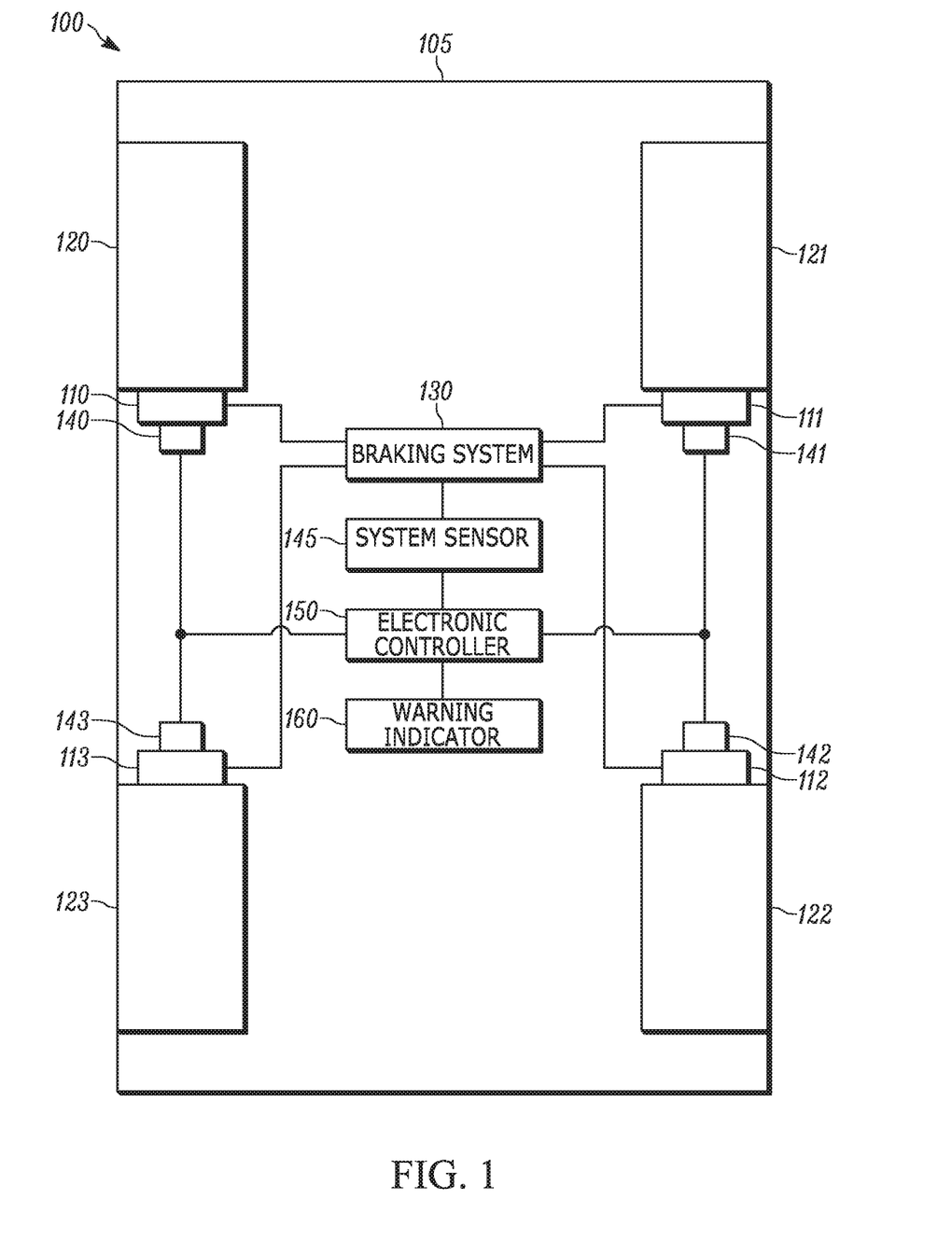
FIG. 1 illustrates a system for detecting brake fading in a vehicle according to one embodiment.

FIG. 1 illustrates a system 100 for detecting brake fading in a vehicle 105 according to one embodiment. Although it is possible to implement embodiments using at least one brake, in the example shown, the system includes brakes 110, 111, 112, and 113. Each brake 110-113 is associated with one wheel 120, 121, 122, and 123 of the vehicle 105. Each brake 110-113 is connected to a braking system 130 of the vehicle 105. Each brake 110-113 also has an associated sensor 140, 141, 142, and 143. The system also includes a system sensor 145, an electronic controller 150, and a warning indicator 160.

Each of the brakes 110-113 provides a stopping force for the associated wheel 120-123. The brakes 110-113 may be disc brakes, drum brakes, and the like. Each of the brakes 110-113 is coupled to the braking system 130. The braking system 130, in one embodiment, is a hydraulic braking system utilizing a master cylinder that takes in a brake input (for example, a brake pedal being depressed by a driver of the vehicle 105 or an electrical signal indicating a brake pedal has been depressed) and sends, in response to the brake input, hydraulic fluid to slave cylinders located at the brakes 110-113 to apply the brakes 110-113 to the wheels 120-123. In some embodiments, the braking system 130 is electronically coupled to the electronic controller 150.

Each of the sensors 140-143 is electronically coupled to the electronic controller 150. The sensors 140-143 are configured to gather data about the respective brake 110-113. For example, the sensors 140-143 may be configured to estimate a brake disc temperature of a brake disc of each of the brakes 110-113. The sensors 140-143 may also be configured to determine a pressure of a cylinder associated with each of the brakes 110-113. The sensors 140-143 may be, in some embodiments, an array of sensors configured to gather different types of data, such as the brake disc temperature or cylinder pressure. In other embodiments, the sensors 140-143 are configured to detect a wheel speed or deceleration caused by the brakes 110-113.

The system sensor 145 is electronically coupled to the electronic controller 150. The system sensor 145 gathers data about the braking system 130. For example, the system sensor 145 measures a pressure of the braking system 130, a volume of hydraulic fluid in the braking system 130, and the like. In some embodiments, the system sensor 145 is an array of sensors configured to gather different types of data, such as a pressure of the braking system 130 or a volume of hydraulic fluid in the braking system 130.

Figure 2:
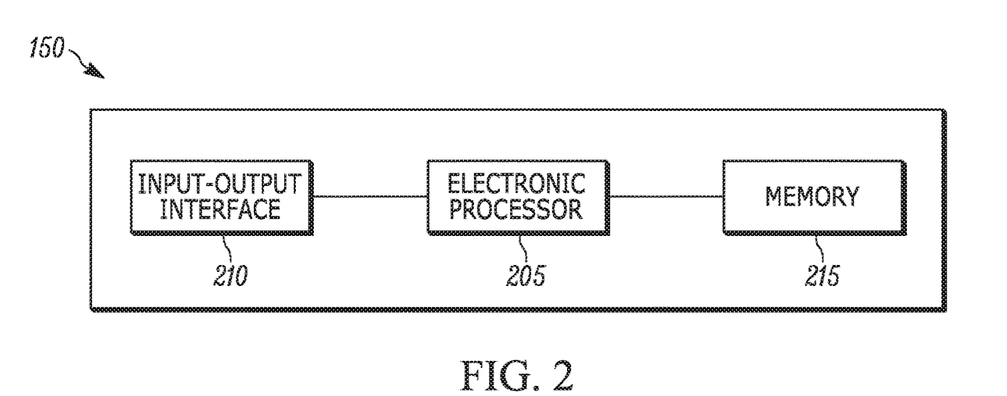
FIG. 2 illustrates an electronic controller according to one embodiment.

An example embodiment of the electronic controller 150 is illustrated in FIG. 2. The electronic controller 150 includes an electronic processor 205, an input-output interface 210, and a memory 215. The electronic processor 205 executes instructions to, among other things, perform the methods as described herein. The electronic processor 205 is electronically connected to the input-output interface 210 and the memory 215. The input-output interface 210 allows the electronic controller 150 to communicate with other electronic components of the system 100 (for example, the sensors 140-143, the system sensor 145, and the warning indicator 160 as described below). The memory 215 stores data and instructions executable by the electronic processor 205.

Returning now to FIG. 1, the system 100 also includes the warning indicator 160. The warning indicator 160 is, for example, a device in the vehicle 105 that indicates to a driver of the vehicle 105 that brake fading is occurring. In some embodiments, the warning indicator 160 is a haptic device that provide an indication of a change in a pedal feel of a brake pedal that is part of the braking system 130 (such as mimicking the feel of a brake pedal in a hydraulic brake system if brake fading has occurred for a brake-by-wire system). In other embodiments, the warning indicator 160 is a light-emitting diode ("LED") or other warning lamp on a dashboard of the vehicle 105. The warning indicator 160 may also be a limiting of engine speed of the vehicle 105.

Figure 3:
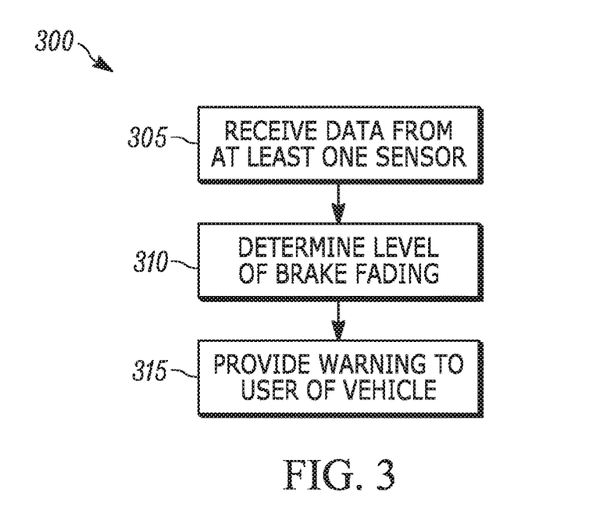
FIG. 3 illustrates a flow chart of a method of detecting brake fading in a vehicle according to one embodiment.

FIG. 3 illustrates a flow chart of an example method 300 of detecting brake fading in the vehicle 105 according to one embodiment. The method 300 is performed by the electronic processor 205 of the electronic controller 150 utilizing the memory 215.

The method 300 includes receiving, with the electronic controller 150, data from at least one of the sensors 140-143 and/or the system sensor 145 (at step 305). Data acquired from the sensors 140-143 and/or the system sensor 145 is indicative of performance of the brakes 110-113 and/or the braking system 130 as a whole. In some embodiments, the data is gathered at a when the vehicle 105 is at a standstill. In other embodiments, data is gathered while the brakes 110-113 are in operation (for example, when the brakes 110-113 are in contact with the wheels 120-123) or when the braking system 130 is in operation (for example, a master cylinder applying pressure to hydraulic fluid to operate the brakes 110-113).

The method 300 also includes determining, with the electronic controller 150, a level of brake fading based upon the data received (at step 310).

One of the indications of brake fading is brake temperature. For example, brake fading may be assumed to have occurred when the temperature of at least one of the brakes 110-113 is a higher brake temperature than a normal brake temperature when a brake disc is applied to the wheel 120-123. The sensors 140-143 may be configured to detect the brake temperature and send the temperature data to the electronic controller 150. In some embodiments, a brake temperature model is used. For example, the brake temperature model may utilize brake pressure and wheel speed information to calculate heat generation and a cooling effect of the brakes 110-113. Utilizing this information, the electronic controller 150 may estimate a brake temperature of at least one of the brakes 110-113. However, in some use cases (such as downhill braking and continuous braking), brake temperature is not sufficient for determining brake fading.

Another indication of brake fading is the braking system 130 lock pressure. The lock pressure is the pressure of the braking system 130 that locks up the wheels 120-123 when the brakes 110-113 are applied. A larger lock pressure is required as more brake fading occurs. The system sensor 145 is configured, in some embodiments, to detect the lock pressure of the braking system 130. However, the lock pressure of the braking system 130 is only useful when high pressure braking is needed. Therefore, lock pressure is not useful for detecting brake fading when only low pressure braking is required.

Figure 4A:
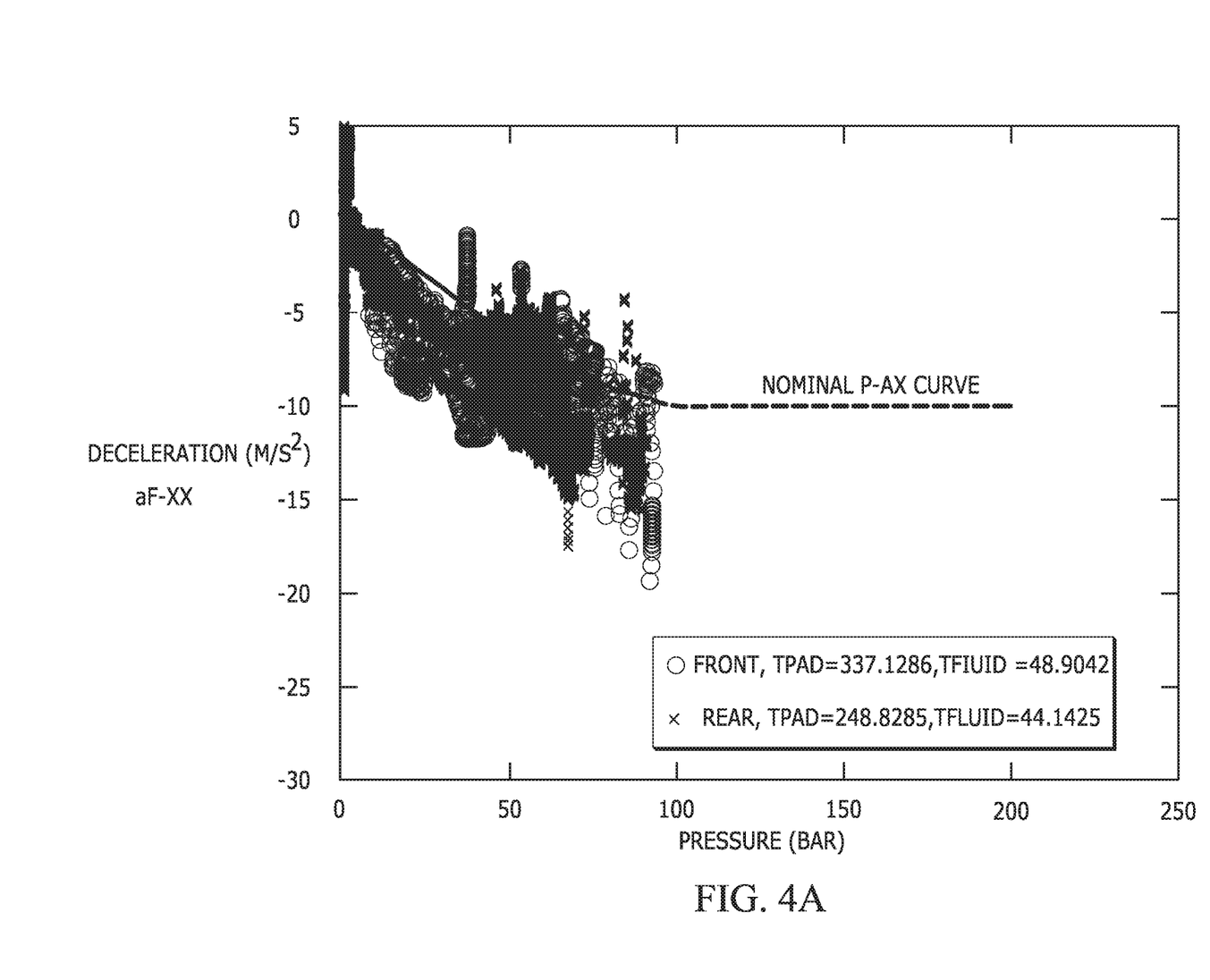
FIG. 4A shows a pressure applied by brakes graphed against a deceleration of a vehicle in a normal braking procedure according to one embodiment.
Figure 4B:
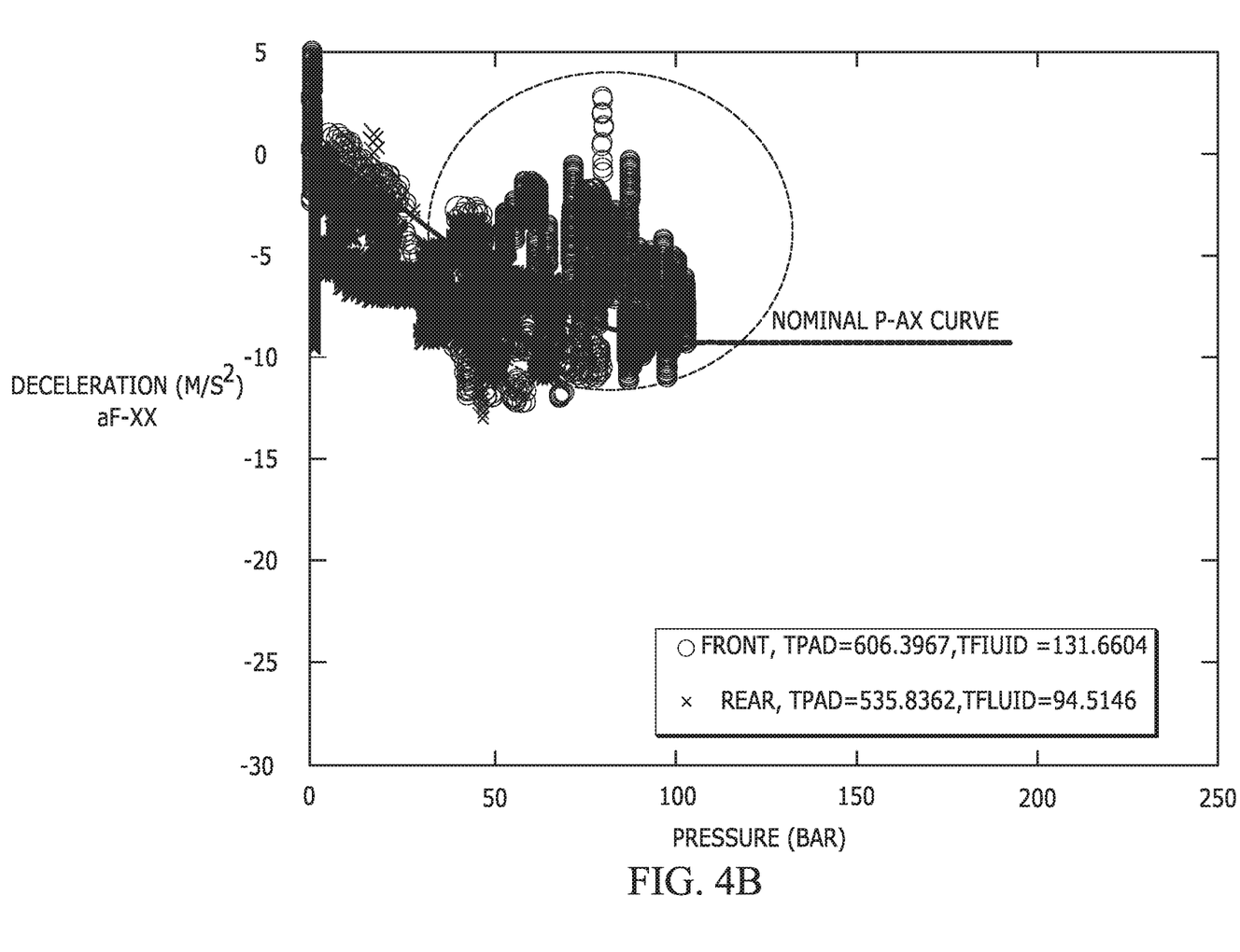
FIG. 4B illustrates brake fading affecting pressure-vs-acceleration values during a braking maneuver according to one embodiment.

Another indication of brake fading is a pressure-vs-acceleration ("PAx") indication. For example, FIG. 4A shows a pressure applied by the brakes 110-113 graphed against a deceleration of the vehicle 105 in a normal (no brake fading or minimal brake fading) braking procedure. In contrast, FIG. 4B illustrates brake fading affecting the PAx values. As shown, there is less deceleration when more brake fading has occurred. Therefore, deceleration values spike towards 0 (less deceleration occurs in response to the same pressure being applied by the brakes 110-113 or the braking system 130). In some embodiments, the PAx values are compared to a nominal PAx curve that represents expected PAx values. If the detected PAx values vary by more than a threshold from the nominal PAx curve, the electronic controller 150 determines that brake fading has occurred. In addition, the electronic controller also provides the operator of the vehicle a warning (as discussed below). The PAx values may be measured for only one of the brakes 110-113, for more than one of the brakes 110-113, or for the entirety of the braking system 130.

Figure 5:
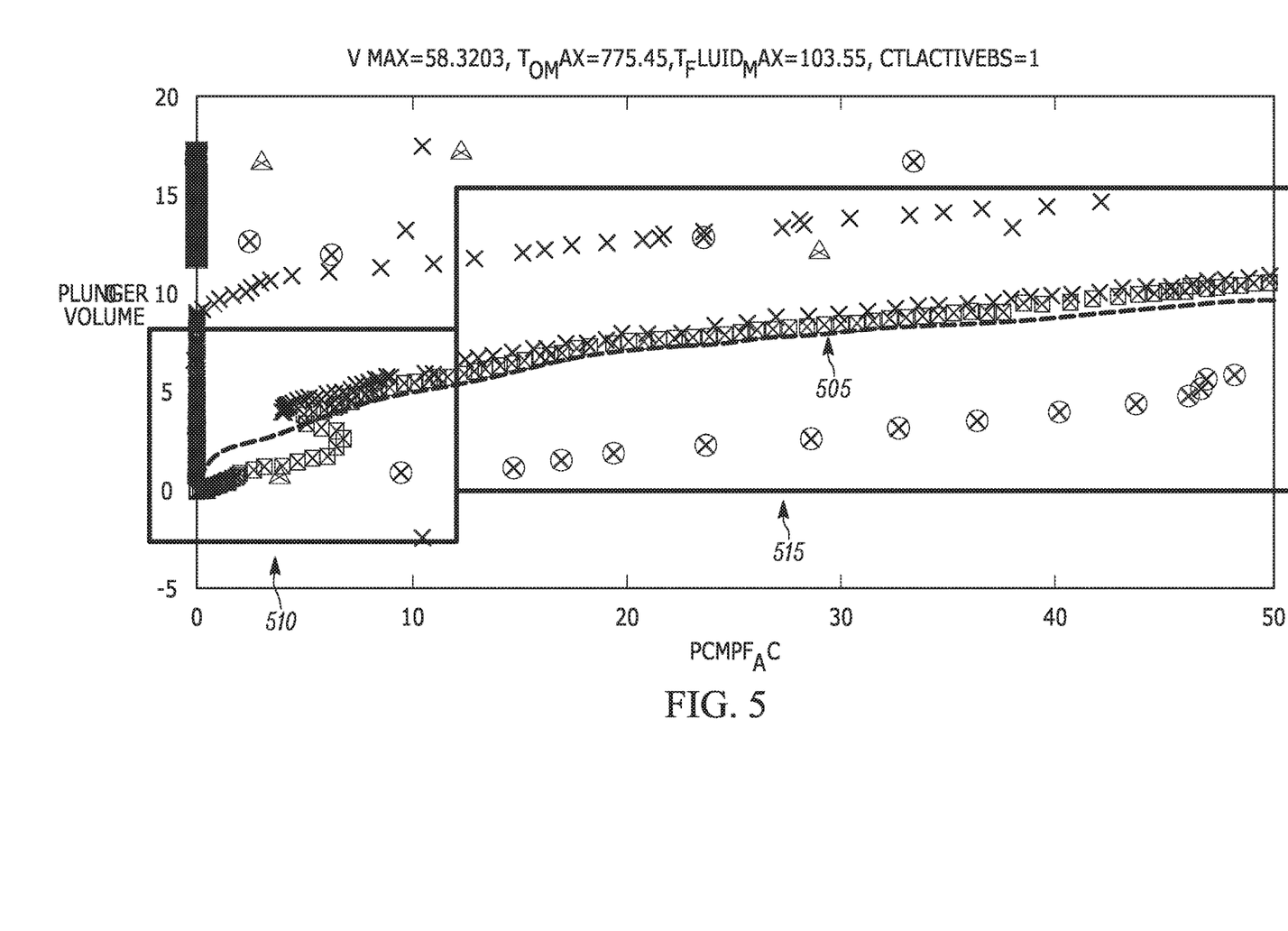
FIG. 5 illustrates a pressure-volume curve of a vehicle that is experiencing brake fading according to one embodiment.

Another indication of brake fading is a pressure-volume ("PV") indication. For example, FIG. 5 illustrates a pressure-volume curve of a vehicle that is experiencing brake fading. In some embodiments, the braking system 130 includes a plunger that can apply a pressure to the braking system 130 without a user input from the operator of the vehicle 105. The plunger is moved to change the volume of hydraulic fluid in the braking system 130, which causes a change in pressure in the braking system 130. Similar to the PAx values varying from the nominal PAx curve, if PV values vary from a nominal PV curve 505 by a threshold, the electronic controller 150 determines that brake fading has occurred to a point where an operator of the vehicle 105 needs to be warned or an action needs to be taken (as discussed below).

The PV indication may include two separate indications determined by two different thresholds. For example, at a lower end 510 of a PV curve (close to 0 on a pCmpF$_4$C axis in FIG. 5), the PV value may below the nominal PV curve 505. This indicates brake fading may be occurring. In an upper end 515 of the PV curve (further long the pCmpF$_4$C axis in FIG. 5), the PV value will be higher than the nominal PV curve 505, which is also indicative of brake fading.

Figure 6:
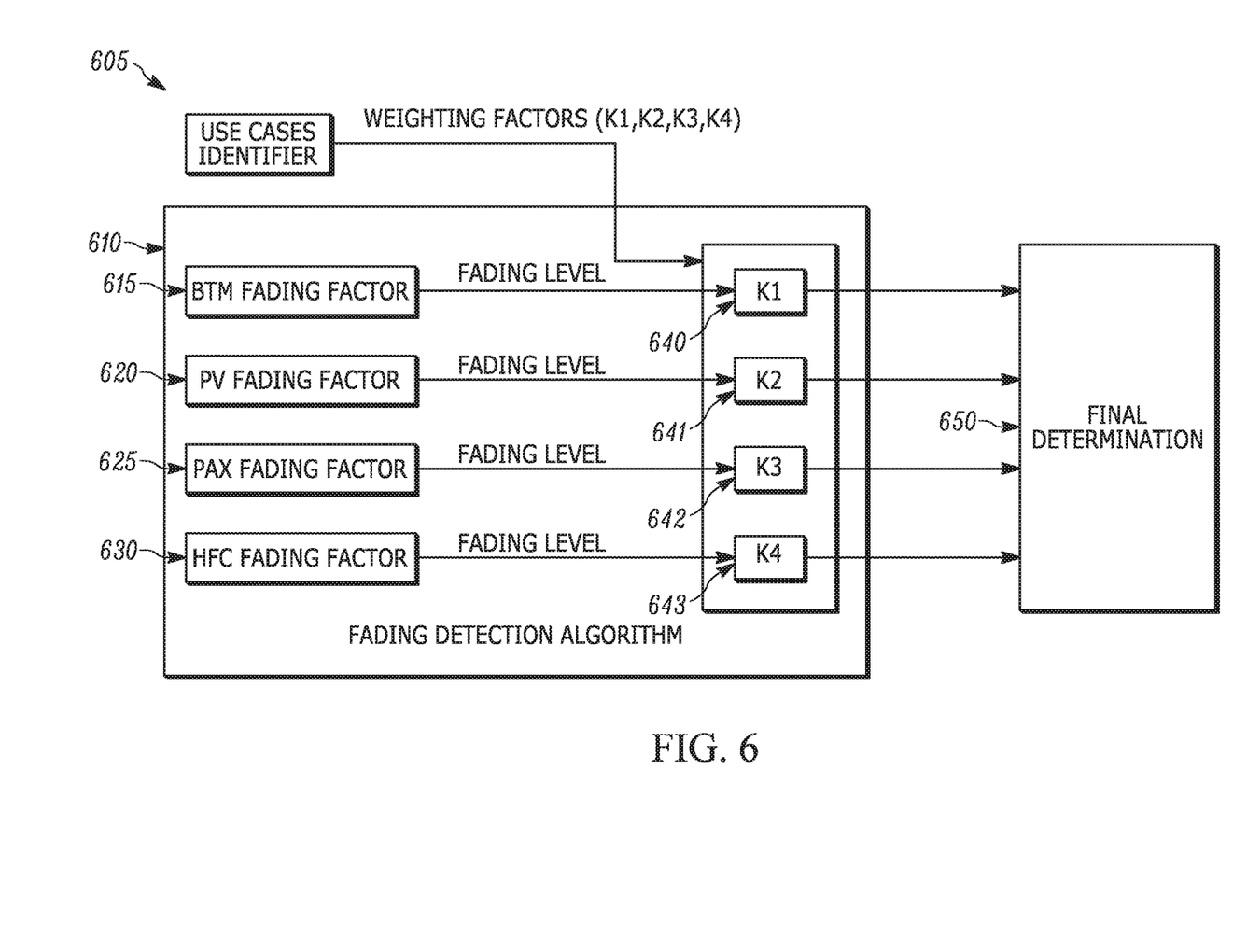
FIG. 6 illustrates an electronic controller using weight factors to determine a level of brake fading according to one embodiment.

In some embodiments, more than one of the above-discussed indications are determined by the electronic controller 150. If more than one indication is determined, the electronic controller 150 is configured to give weight factors to each indication in order to determine the level of brake fading occurring. For example, FIG. 6 illustrates how the electronic controller 150 uses weight factors to determine a level of brake fading. The memory 215 may store a set of use case identifiers 605 and a fading detection algorithm 610.

The use case identifiers 605 are accessed by the electronic processor 205 to determine a use case for the fading detection algorithm 610. In some embodiments, the electronic controller 150 determines the use case using data from the sensors 140-143 and/or the system sensor 145. In other embodiments, the electronic controller 150 determines the use case using other sensors in the vehicle 105 or through other means. Examples of use cases include downhill braking, high pressure braking, continuous braking, standstill braking, and the like.

Each of the use cases 605 assigns weighting factors to each of the indications of brake fading. For example, the sensors 140-143 and the system sensor 145 may detect a brake temperature factor 615, a PV factor 620, a PAx factor 625, and a lock pressure factor 630 of the braking system 130. Each of these values is then assigned a weight 640, 641, 642, and 643 based upon which of the use cases 605 the electronic controller 150 determines is occurring.

The weighted factors are then processed by the electronic processor 205 to create a final determination 650 of the level of brake fading in the vehicle 105. The final determination 650 may represent a total amount of brake fading in the vehicle 105 or in an individual brake 110-113. In some embodiments, the final determination is a percentage of brake fading (for example, 100% being new brakes, 50% being brakes operating at 50% of new brake capacity, and the like). In other embodiments, the final determination 650 is compared to a threshold to determine the amount of brake fading present.

Figure 7:
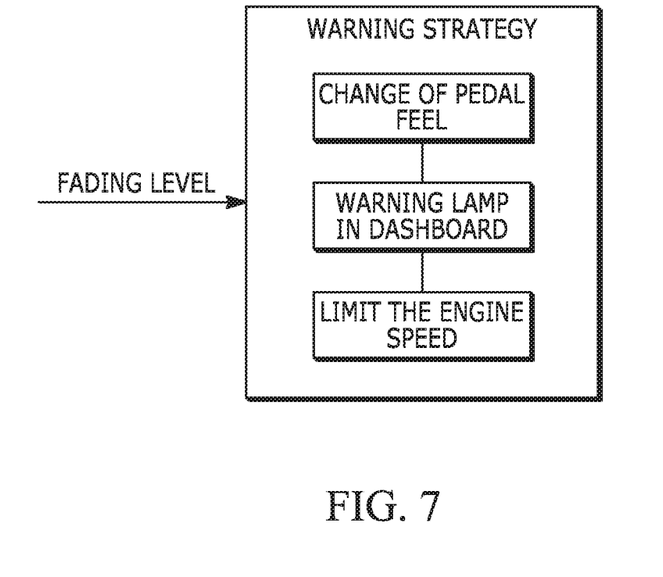
FIG. 7 illustrates a method of determining a warning strategy based upon a level of braking according to one embodiment.

Returning to FIG. 3, the method 300 further includes taking an action, using the electronic controller 150, for the vehicle 105 based upon the level of brake fading determined. The action is used to provide a warning to a user of the vehicle 105 that the level of brake fading has been determined. For example, in FIG. 7, the electronic controller 150 determines the level of brake fading and then determines an action strategy based upon the level of brake fading. The electronic controller 150 may be configured to change a pedal feel of a brake pedal if the final determination 650 is above a first threshold, turn on a warning lamp in a dashboard of the vehicle 105 if the final determination 650 is above a second threshold, or limit an engine speed of an engine of the vehicle 105 if the final determination 650 is above a third threshold.

In some embodiments, the vehicle 105 is an autonomous vehicle. If the vehicle 105 is autonomous, the electronic controller 150 may be configured to generate a signal to control the vehicle 105. For example, based upon the determined level of brake fading, the electronic controller 150 is configured to generate a signal to control the vehicle 105 to pull over to the side of the road, navigate to a service station, limit vehicle performance (such as limiting a speed of the vehicle 105), and the like.

Thus, embodiments described herein are generally directed towards detecting brake fading in a vehicle.

Various features, advantages, and embodiments are set forth in the following claims.

The invention claimed is:

1. A system (100) for detecting brake fading, the system (100) comprising:
    at least one sensor (140-143) configured to gather data about at least one brake (110-113) in a vehicle (105),
    a braking system (130),
    a braking system sensor (145) configured to gather data about the braking system (130), and
    an electronic controller (150) configured to
        receive data from at least one selected from the group consisting of the at least one sensor (140-143) and the braking system sensor (145),
        determine, based on the data, a use case (605) of the braking system (130), wherein the use case (605) of the braking system (130) includes a set of indications selected from the group consisting of a temperature of a braking component, a volume of a hydraulic fluid, a brake pressure versus a vehicle deceleration value, and a wheel locking pressure,
        assign, based on the use case (605) of the braking system (130), a weighting factor to each indication of the set of indications to create weighted indications, and
        determine, based on the data and the weighted indications, a level of brake fading of the vehicle (105) that is occurring, wherein the level of brake fading represents a loss of braking ability of the braking system (130).

2. The system (100) of claim 1, wherein the electronic controller (150) is further configured to take an action based upon the determined level of brake fading, and wherein the action is causing a warning to be provided to a user of the vehicle (105).

3. The system (100) of claim 2, wherein the action is at least one selected from the group of actions consisting of changing a pedal feel of a brake pedal, turning on a warning lamp in a dashboard of the vehicle, and limiting an engine speed of an engine of the vehicle.

4. The system (100) of claim 3, wherein the at least one action is determined based upon a comparison of the determined level of brake fading to at least one threshold.

5. The system (100) of claim 4, wherein the action includes changing the pedal feel of the brake pedal if the determined level of brake fading is below a first threshold.

6. The system (100) of claim 5, wherein the action includes turning on the warning lamp in the dashboard of the vehicle (105) if the determined level of brake fading is above the first threshold and below a second threshold.

7. The system (100) of claim 6, wherein the action includes limiting the engine speed of the engine of the vehicle (105) if the determined level of brake fading is above the second threshold.

8. The system (100) of claim 1, wherein the data includes a group of indications and wherein a weighting factor is assigned to each indication of the group of indications.

9. The system (100) of claim 8, wherein the electronic controller (150) is configured to determine the level of brake fading based upon the weighting factor of each indication.

10. The system (100) of claim 9, wherein the level of brake fading is determined as a percentage of brake capacity.

11. The system (100) of claim 9, wherein the electronic controller (150) compares the level of brake fading to a threshold.

12. The system (100) of claim 1, wherein the use case (605) is at least one from the group of use cases consisting of downhill braking, high pressure braking, continuous braking, and standstill braking.

13. The system (100) of claim 1, wherein the braking system sensor (145) is configured to gather data about the braking system (130) when the vehicle (105) is at a standstill.

14. A method (300) for detecting brake fading, the method comprising:
- receiving (305), with an electronic controller (150), data from at least one of the group consisting of at least one sensor (140-143) and a braking system sensor (145);
- determining, with the electronic controller (150), a use case (605) of the braking system (130) based on the data, wherein the use case (605) of the braking system (130) includes a set of indications selected from the group consisting of a temperature of a braking component, a volume of a hydraulic fluid, a brake pressure versus a vehicle deceleration value, and a wheel locking pressure,
- assigning, with the electronic controller (150), a weighting factor to each indication of the set of indications to create weighted indications based on the use case (605) of the braking system (130), and
- determining (310), with the electronic controller (150), a level of brake fading of a vehicle (105) that is occurring based upon the data and the weighted indications, wherein the level of brake fading represents a loss of braking ability of the braking system (130).

* * * * *